2

3,345,319
PREPARATION OF EXTRUDED CATALYSTS AND CATALYST SUPPORTS CONTAINING POLYACRYLAMIDE
Joseph D. Colgan, Ozone Park, N.Y., and John M. Witheford, Riverside, Conn., assignors to American Cyanamid Company, Stamford, Conn., a corporation of Maine
No Drawing. Filed Aug. 6, 1965, Ser. No. 477,968
8 Claims. (Cl. 260—29.6)

ABSTRACT OF THE DISCLOSURE

A composition comprising an inorganic oxide support compound and a polyacrylamide which is more readily extrudable, the extrudate having improved crush strength, and a method for extruding an inorganic oxide support.

---

This invention relates to a method for the auger extrusion of high-solids content extrusion feed of inorganic-oxide-support materials such as alumina, silica-alumina, silica-magnesia, etc., for the improved production of extrudates having high crush strength.

Prior to this invention, the solids content, or non-volatile content, of extrusion feed mixes has had an upper limit fixed by practical considerations. Attempts to extrude feed mixes with solids contents greater than this upper limit has brought about undesirable conditions such as plugged extrusion dies, inconsistent extrudate quality, overloading of the extruder drive mechanism, rupture of the extrusion die plate, generation of excessive frictional heat, a decrease or cessation in extrusion flow caused by slippage of the extrusion feed on the extruder barrel wall, and other problems.

The practical upper limited of the extrusion feed mix solids level is dependent on the properties of the inorganic oxide such as particle size, particle shape and pore volume. Therefore, it is not reliably possible to categorize a specific upper limit of solids-content for the prior art.

One conventional method for the manufacture of formed catalysts and catalyst supports involves the extrusion of mixes prepared from ground powder and water, or water solutions of metal promoters. The attainment of satisfactory strength levels in the extrudates or formed particles is believed to be dependent on the formation of bonds between the individual dry particles during subsequent drying calcination operations. In general, the degree of bonding, and hence the density and strength of extrudates, is increased by increasing the extent of compaction or densification in the undried extrudate. Densification or compaction may be achieved in either pre-extrusion mixing operations or in the extrusion operation itself. In either case, the volatile or non-solid (such as moisture) content of the mix limits the degree of densification which may be obtained. As a result, it is frequently necessary or desirable to extrude at or above a given solids level.

At the high-solids levels which are frequently required, extrusion often becomes difficult if not impossible. High pressures are required to produce flow through the orifices in the extruder die plate. These high pressures can overload the drive mechanism of the extruder, and/or rupture the extruder die plate. In most instances, slippage is produced at the extruder barrel wall with a decrease in extrusion rate and production of excessive heat from friction. Several methods have been employed to overcome these problems.

One method involves subjecting the extrusion feed mix to extensive pre-mixing, in order to plasticize the mix; in addition to being extremely costly, this approach has definite limitations. In some instances, for example, the mix will become more fluid or plastic such that it could be expected to extrude at lower pressures, but because of increased plasticity, slippage at the extruder barrel wall increases and the extrusion machine cannot generate the required pressure. As a result, extrusion flow does not take place and temperature in the extrusion machine increases due to production of heat by friction.

Another approach involves the addition of water or other special lubricants to the extrusion feed mix. However, water addition may result in lower density, and weaker extrudates. Furthermore, water frequently reduces the required extrusion pressure while failing to effect satisfactory extrusion because the mix becomes more fluid and excessive slippage at the extruder barrel wall is produced. In such an instance, because of the fluidity of the extrusion feed mix, the extruder cannot develop adequate pressure to produce flow through the die plate. The addition of lubricant such as powdered graphite may be helpful, but in addition to providing lubrication of the die plate and the extruder auger as is desired, the lubricants undesirably provide internal lubrication of the mix. As a result of the internal lubrication, it becomes more difficult to obtain the friction which is required at the barrel wall to obtain good flow. Lubricants can also have an adverse effect on the strength if excessive quantities are employed.

Therefore, prior to this invention, no fully satisfactory method was available to permit the extrusion of high-solids extrusion feed mixes.

Accordingly, an object of this invention is to obtain a method for extruding high-solids extrusion feed.

Another object of this invention is a composition suitable for high-solids extrusion.

Another object is an extrudate having high crush strength.

Other objects become apparent from the above and following disclosure.

The objects of this invention are obtained by admixing (1) a polyacrylamide and (2) an extrusion feed of inorganic oxides such as alumina, silica-alumina, or silica-magnesia, etc., having a solids content of about 32% or more by weight of the mixture, and simultaneously or preferably subsequently extruding the mixture by a conventional extrusion process. The preferred extrusion feed solids includes more than about 75% silica by weight and less than about 25% alumina by weight.

For purposes of this invention, extrusion torque is defined as the torque required to rotate the extruder auger at a given revolution-per-minute (RPM). There are no units for the levels indicated in our data. The levels are relative measures of the torque. High torque levels reflect high extrusion pressure.

Bulk density is the weight per unit volume of bulk sample under prescribed conditions. Apparent bulk density (ABD) is the weight of sample which occupies a unit of volume when the unit of volume is rapidly filled by sample flowing by gravity from a low elevation (several inches). Compacted bulk density (CBD) is the weight of sample which will occupy a unit of volume when the sample is vibrated in a container to minimize container voids and maximize the weight of sample. Note: See Cyanamid Manual, "Test Methods for Synthetic Fluid Cracking Catalyst," p. 9.

Extrudate crush strength is determined by selecting a sample of extrudates with length equal normally to from about 1.5 to about 3.0 times the extrudate diameter. The length of each extrudate is measured and an average length is calculated. Each extrudate is then, in turn, placed between two flat plates and the force required to crush the extrudate is measured. The average crushing force for the sample is then calculated. Division of the average crushing force in pounds by the average extrudate length in inches yields a measure of extrudate crush strength which is termed "CSL." Units are pounds (of force) per inch (of length).

For purposes of this invention, it is important to recognize the distinction between high solids and low solids extrusion feed. The distinction between high and low solids is not readily defined. Viscosity measurements do not suffice because the extrusion mixes are non-Newtonian. Nevertheless, the difference is real and a distinction can be made. Low solids mixes are extruded at very low torque levels, or pressures, and form extrudates which are soft and readily deformed by the application of slight pressures such as pressing between the fingers. In the extreme cases, the extrudates may flow or deform under their own weight. High solids mixes, on the other hand, appear relatively dry or solid, require considerable torque or pressure to extrude, and form extrudates which are firm and do not flow or deform. The exact break point between high and low solids is somewhat arbitrary, covering a range of solids. For xerogel mixes, the solids range which divides high and low solids will depend on the chemical composition of the xerogel, the xerogel particle size and shape, the porosity, pliability, etc. For the extruders which we employ in the examples of this case (Welding Engineers Model 2010 Auxiliary Worm Extruder, operating at 50 r.p.m.), torque readings from zero to twenty would be indicative of a low solids feed mix, torque readings in the 30 plus range would be indicative of a high solids extrusion feed mix. These readings apply so long as reasonable flow is obtained through a die with a restricted open area. However, when with a high solids mix there is excessive slippage on the walls of the extruder barrel with an accompanying stoppage in flow from the extruder dye, the extrusion torque may deteriorate to a low value or zero. In addition, extrusion torque may be low despite a high solids feed mix if no die is employed.

The polyacrylamide which may be employed in this invention may be any polyacrylamide which obtains the desired results as described above. The polyacrylamides primarily contemplated for purposes of this invention range in molecular weight from about one-half million up to ten million or more. The preferred polyacrylamide of this invention has a molecular weight of from about 5 million to about 6 million, and is hereafter referred to as polyacrylamide A. Other polyacrylamides referred to in this disclosure are hereafter referred to as polyacrylamide B. There are no known equivalents to the polyacrylamides for purposes of this invention.

The addition of polyacrylamide A is particularly useful in improving extrusion rates and facilitating extrusion with high solids mixes. In the extrusion of clays and catalysts (unlike thermoplastics extrusion), flow is dependent on minimization of slippage on the extruder barrel walls and a maximization of slippage on the extruder auger. To this end, it is desirable to have a high polish on the auger, and is common practice to use an extruder barrel which has longitudinal grooves therein. These grooves tend to fill with the extrusion feed mix and to produce friction at the barrel wall. It is believed that the polyacrylamide A aids extrusion both by reducing friction on the auger and the die plate and by increasing friction at the barrel wall. The polyacrylamide A imparts a slimy, slippery feel to the mix and reduces friction between the mix and the metal surfaces. However, the polyacrylamide A also imparts a tacky, chewy nature to the extrusion feed mix. Internal friction or viscosity is therefore increased and additional friction is thus produced on the barrel walls. This effect is materially different from the "thickening" effect which is obtained by the employment of plasticizers in low solids mixes, typical thickeners being starches, gums, and carboxylated alkylated celluloses.

The optimum level of polyacrylamide is not known. However, as little as 0.25% solids, based on the solids weight content, of polyacrylamide is effective for obtaining the objects of this invention, and there does not appear to be any substantial increase in the advantages obtained when the polyacrylamide is employed in an amount in excess of about 5%, based on the extrusion feed mix solids weight. Normally, polyacrylamide A is employed at a level of about 1%.

There is no known preferred method of incorporating the polyacrylamide of this invention into the extrusion feed mix of alumina or silica-alumina. The extrusion mix and polyacrylamide are not noramlly subjected to any lengthy or extensive mixing. Good results are obtained if the polyacrylamide A, for example, is merely well-distributed throughout the extrusion feed. There is no need to solubilize the polyacrylamide A or to disperse it throughout the mix so as to obtain homogeneity in the fine particle size range. The polyacrylamide A has actually been employed in instances in which extrusion performance was poor and deteriorating, by merely sifting the polyacrylamide A into the extruder feed hopper with the extruder feed mix; this effects an immediate increase in extrusion rate and frequently unplugs dies which had previously become plugged.

The following examples do not limit the scope of this invention except insofar as limitations appear in the appended claims, the following examples being intended merely to illustrate the invention.

In each of the following examples, data regarding the various die numbers is as follows in Table I:

TABLE I

| Die No. | Holes No. | Hole Diam. (in.) |
| --- | --- | --- |
| 4 | 27 | 0.272 |
| 5 | 24 | 0.144 |
| 7 | 28 | 0.147 |
| 8 | 28 | 0.191 |
| 9 | 104 | 0.063 |
| 6 | 90 | 9.082 |
| 11 | 72 | 0.072 |
| 14 | 176 | 0.075 |
| 15 | 433 | 0.0400 |
| X | 43 | 0.196 |

*Example 1, (a)–(e)*

(a) An extrusion feed mix is prepared by mixing 2.5 parts of water with 3.0 parts of a silica-magnesia xerogel (cracking catalyst) with pore volume of 0.81 cc. per gram, bulk density of 0.39 grams per cc., and $SiO_2/M_2O$ is 71/29. After extensive mixing an attempt is made to extrude the mix through a die plate with approximately ⅛″ diameter holes (No. 5). The mix is so dry that the extruder drive mechanism is overloaded and the extruder drive cuts off without producing any extrudates. (b) After addition of ¼ part of water to the mix, the same result is obtained. (c) After addition of a second ¼ part of water, extrusion is obtained at a moderate torque of 35. The torque level and the extrusion rate, however, rapidly decrease as slippage on the walls of the extruder barrel develops. After addition of 0.15 part of xerogel, extrusion is obtained at a high torque reading of 55. Excessive heat, however, is generated and the extrudates have serrated surfaces caused by excessive friction on the die plate. (d) After addition of 0.1 part of water, extrusion is again obtained at a moderate torque reading of 35, but both again torque and flow rate rapidly decrease. (e) At this point 0.022 part of polyacrylamide A are added. Excellent extrusion is then obtained at a torque reading of 35.

The above Example 1, a–e shows that despite variation of the xerogel/water ratio over a wide range, satisfactory extrusion cannot be obtained. After addition of the polyacrylamide A satisfactory extrusion results.

To further demonstrate the beneficial effect of the polyacrylamide A, a second extrusion mix is prepared as described below.

Example 2

About 2.9 parts of water are added to 3.0 parts of silica-magnesia xerogel and intensively mixed. To this mix is added 0.066 part of polyacrylamide A. Extrusion is then attempted using the same die plate as in Example 1, (a). Excellent extrusion is obtained at a torque level of 55. To an unextruded portion of the mix additional water is added and extrusion is effected at a torque level of 35. Portions of both extrudates are oven dried and calcined at 1100° F. for one hour. Properties of these samples are listed in Table II below.

TABLE II

| Sample No. | Torque | Diam. (in.) | Pore Volume (cc./gm.) | CSL (lbs./in.) |
|---|---|---|---|---|
| 1 | 55 | .135 | .435 | 74 |
| 2 | 35 | .135 | .435 | 75 |

It can been from Table II that both samples have good crush strength.

Example 3

Thirty parts of a nickel and fluoride-containing silica-alumina xerogel are intensively mixed with 22 parts of water. The solids content of this mix is 44%. A 5 lb. portion of this mix is mixed with 0.66 lb. of 71% nitric acid and 0.22 pound of water. This mix is fed to an extruder equipped with a die plate with approximately 1/16" diameter holes (No. 11 die). Very little flow can be obtained through the extruder die face. Despite modification of the mix with water and additional quantities of the 44% solids mix to cover the full range of the extruder torque (0–60), no flow can be obtained. The mix merely rides on the auger, slipping on the walls of the barrel. At the higher solids levels the initial torque is high but decreases rapidly and excessive heat is generated. A second mix is prepared by mixing 5 lbs. of the 44% solids mix with 0.66 lb. of 71% nitric acid, 0.21 lb. of water and 0.0264 lb. of polyacrylamide A. This mix is extruded through a die plate (No. 11) with approximately 1/16" diameter die holes with no difficulty. The extrusion rate is high; flow is obtained from all orifices in the die plate; and extrudates, after drying and calcining 1 hour at 1100° F., are whole and strong. Extrusion data and extrudate properties are listed in Table III below.

TABLE III

| Feed Solids, Percent | Extrusion | | Extrudate Properties | | |
|---|---|---|---|---|---|
| | Torque | Rate, lbs./min. | PV, cc./gm. | Diam., in. | CSL, lbs./in. |
| 41.7 | 39 | 2.8 | .340 | .057 | 178 |

The nickel and fluoride-containing silica-alumina xerogel used in the above example is prepared by mixing sulfuric acid with a sodium silicate-water solution to produce a silica gel which is then coated with alumina by adding aluminum sulfate and sodium aluminate solutions to precipitate alumina. The coated gel is washed to remove sodium and sulfate, mixed with a water solution of nickel nitrate and ammonium fluoride, then filtered and washed to reduce ammonia and nitrate content, and finally spray dried. The spray-dried xerogel is analyzed; there is approximately 20% loss on ignition; alumina/silica ratio is 22/78; nickel content is 4.0%; fluoride content is 3.0%; and pore volume is 0.60 cc./gm.

Example 4

To 20 parts of silica-alumina fluid cracking catalyst is added 5.34 parts cobalt nitrate-water solution (percent Co.O=12.2) and a solution of 3.88 parts of ammonium molybdate in 24 parts of water. This mix is intensively mixed and two 4 lb. portions are removed. One portion (d–1) is mixed with 150 cc. of water and 50 cc. of 71% nitric acid. The other portion (d–2) is mixed with 150 cc. water, 50 cc. 71% nitric acid and 7 gms. of polyacrylamide A. Each of these modified mixes is then extruded using, in order, die plates with 0.196" (No. X), 0.147" (No. 7) and 0.072" (No. 11) diameter holes. Extrusion conditions for each run are listed below. Portions of the 1/16" diameter extrudates (No. 11 die) are oven dried and calcined for 1 hour at 1200° F. Properties of these extrudates are also listed in Table IV below. The data show both improved extrusion rates and extrudate strength for the polyacrylamide A-modified mix.

TABLE IV

| Sample No. | Feed Mix | | Extrusion | | | | | | Properties of No. 11 Die Extrudates Calcined 1,200° F. | | |
|---|---|---|---|---|---|---|---|---|---|---|---|
| | | | No. X Die | | No. 7 Die | | No. 11 Die | | | | |
| | Solids, percent | Polyacrylamide-A, percent | Torque | Rate, lbs./min. | Torque | Rate, lbs./min. | Torque | Rate, lbs./min. | Diam., in. | PV, cc./gm. | CSL, lbs./in. |
| d–1 | 44.1 | 0 | 14 | .50 | 15 | .98 | 25 | .35 | .060 | .58 | 30 |
| d–2 | 44.3 | 0.77 | 22 | .54 | 27 | 2.1 | 45 | 1.0 | .059 | .55 | 57 |

Although the examples and disclosure are representative of the invention, the scope of the invention should not be construed as limited thereby, except as limited in the appended claims.

We claim:

1. A method for extruding a high solids content feed containing an inorganic oxide-support material selected from the group consisting of silica, alumina, magnesia and mixtures thereof, the improvement comprising (1) admixing (a) a polyacrylamide having a molecular weight from five million to six million in an amount effective to facilitate said extrusion and (b) an extrusion feed, in which the solids content exceeds about 32% solids, and (2) extruding said admixture.

2. In a process of extruding a high solids content feed containing an inorganic oxide-support material selected from the group consisting of silica, alumina, magnesia and mixtures thereof in which the solids content exceeds about 32% solids in an aqueous diluent, the improvement comprising admixing a polyacrylamide having a molecular weight from about 5 million to 6 million into said feed in an amount of at least about 0.25% to 5% based on the solids weight content of said feed.

3. A composition comprising an inorganic oxide-support material selected from the group consisting of silica, alumina, magnesia and mixtures thereof, a polyacrylamide having a molecular weight from five million to six million in an amount of at least about 0.25% based on the solids weight of said composition, and an aqueous diluent, said composition being in excess of about 32% by weight solids content.

4. A composition comprising silica-alumina, a polyacrylamide having a molecular weight from five million to six million in an amount of at least about 0.25% to 5% based on the solids weight of said composition, and an aqueous diluent, said composition being in excess of about 32% by weight solids content.

5. An extrudate having high crush strength formed from an extrusion feed having a solids content in excess of about 32% solids comprising an inorganic oxide-support material containing silica and a polyacrylamide having a molecular weight from five million to six million in an amount of at least about 0.25% to 5% based on the solids weight content of said feed.

6. An extrudate having high crush strength formed from an extrusion feed having a solids content in excess of about 32% solids comprising silica-alumina, and a polyacrylamide having a molecular weight from five million to six million in an amount of at least about 0.25% to 5% based on the solids weight content of said feed.

7. In a method of extruding alumina-containing feed, in which the solids content exceeds about 32% solids in an aqueous diluent, the improvement comprising admixing (1) a polyacrylamide having a molecular weight from five million to six million in an amount of at least about 0.25% to 5% based on the solids weight content of said feed and (2) said extrusion feed.

8. A composition comprising alumina, a polyacrylamide having a molecular weight from five million to six million in an amount of at least about 0.25% to 5% based on the solids weight of said composition and an aqueous diluent, said composition having in excess of about 32% by weight solids content.

References Cited

UNITED STATES PATENTS 2,943,129    6/1960    Miller et al. _____ 252—430

JULIUS FROME *Primary Examiner.*

S. L. FOX, *Assistant Examiner.*